Figure 1:
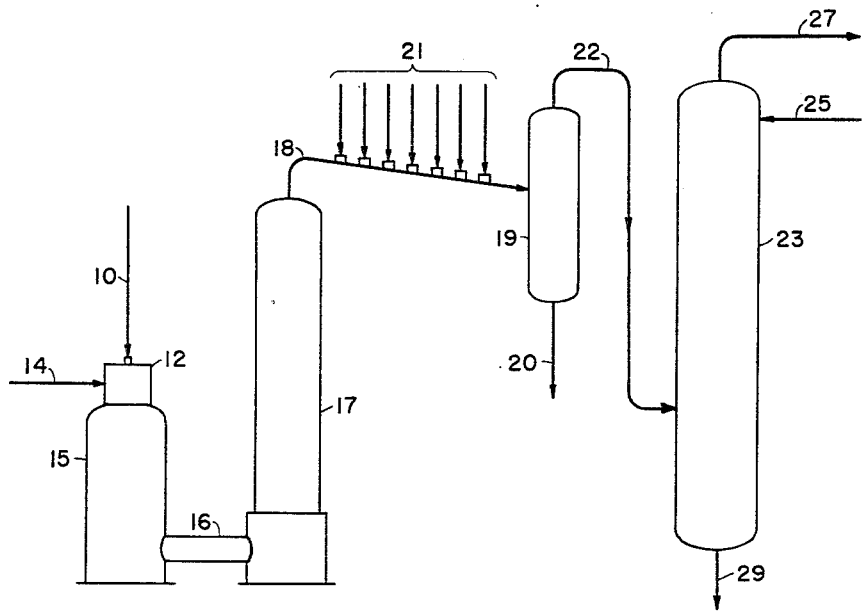

May 31, 1960   W. NAGELKERKE ET AL   2,938,599
SOOT REMOVAL FROM GASES
Filed July 29, 1957

INVENTORS:
WILLEM NAGELKERKE
GERRIT MEIJER

BY: John H. Colvin
THEIR ATTORNEY

United States Patent Office 2,938,599
Patented May 31, 1960

---

2,938,599

SOOT REMOVAL FROM GASES

Willem Nagelkerke and Gerrit Meijer, The Hague, Netherlands, assignors to Shell Oil Company, a corporation of Delaware Filed July 29, 1957, Ser. No. 674,968

Claims priority, application Netherlands Aug. 10, 1956

3 Claims. (Cl. 183—120)

This invention relates to an improvement in the removal of soot from gases through the medium of water washing.

Soot is a common component of manufactured gaseous mixtures which may be produced in various ways, for example, by partial combustion and by the cracking of hydrocarbons. These manufactured gases are supplied for several different purposes, among these there are gases used as synthesis gases such as in ammonia production and gases produced as sources of hydrogen for hydrogenation.

The gases from the generator or other manufacturing unit normally have very high temperature, upwards of 1,000° C. It is common practice to spray these hot gases with large amounts of water for a two-fold purpose, namely, to effect a cooling to room temperature, say 20° C. and simultaneously to scrub the gases free of carbon. Because of the large quantities of water used, the carbon is necessarily separated from the gases in an objectional dilute aqueous soot suspension. The soot is customarily separated from the scrub water in order to make it available for carbon black and to provide a soot free industrial water that may be further used. This is conventionally done by holding the soot in water suspension for long periods of time in large sedimentation tanks. It has now been discovered that the amounts of water required to bring about cooling of the furnace gases to ambient room temperature are unnecessarily large for the purpose of soot removal and that it is possible to bring about a substantial complete removal of the soot with significantly less water. It will be appreciated that the use of less water for soot removal will facilitate the separation of the soot from its scrub water.

In the improved process of the invention, the gases from the gas generator, furnace, or other source are sprayed with finely dispersed water to bring about a saturation of the gases and to disperse some of the liquid water in droplet form throughout the gases. The spraying is discontinued before the temperature of the sprayed gases drops below about 40° C. of the temperature at the time initial water vapor saturation occurs. The sprayed gas stream then passes to a liquid-vapor separation zone from which there is removed a substantially carbon free gas and a soot in water suspension.

The furnace gases being treated should be at elevated pressure of at least 3 atmospheres absolute and preferably at a pressure within the range of 10–30 atmospheres absolute. The dew point or water-vapor saturation temperature of a gaseous mixture is proportional to the magnitude of pressure, that is to say, smaller amounts of water are needed to saturate high pressure gases with water than are required for the saturation of gases under less pressures. Therefore, it is advantageous in the practice of the process of this invention to spray furnace gases having a relatively elevated pressure for the reason a smaller amount of water is then sufficient for the removal of the soot. It has been experienced that the amount of water required to saturate the air and to lower its temperature to not more than 40° C. below the saturation temperature (at the prevailing pressure) is ample to effect a substantially complete separation of the soot in a water suspension from the gases in the subsequent separation zone. Normally, it is not necessary to drop the temperature the full 40° C. as it is generally sufficient to saturate the air and to disperse throughout that air some liquid water in droplet form. The gases from this initial spraying, which may be had through a series of spray nozzles placed in succession along the line of flow, will normally have a temperature in the range of 75–250° C. and preferably a temperature in the range of 120–200° C. From the water-vapor separator, the furnace or generator gases will pass to a second heat exchange where their temperature will be lowered to the desired final temperature, for example 20° C., and this will normally be achieved through a second water spraying. Any traces of soot that may have been left by the initial water spraying will be extracted here.

In the preferred embodiment of the improved process, the generator gases are first cooled (before the initial water spraying) by indirect heat exchange to a temperature within the range of approximately 150° to 500° C. and preferably to a temperature in the range of 200–350° C. The cooling is best accomplished by passing the combustion gases through a steam boiler. By lowering the temperature of the hot gases before spraying, still less water is required for scrubbing the gases free of carbon. These partially cooled gases from the steam boiler remain in the desired high pressure range, since the drop in pressure in the boiler is not great. Preferably, the total quantity of water used in the first stage spraying is such that the aqueous soot suspension formed has a carbon concentration of 2–5%. This a decided improvement over the normal soot in water suspension where the soot is present in a much less quantity.

The process of the invention may be used to treat gases from any process in which incomplete combustion of hydrocarbons is had under such conditions that the combustion gases contain a comparatively large amount of hydrogen and carbon monoxide together with a small amount of free carbon or soot. These gases as mentioned before are preferably prepared under such reaction conditions that they leave the gas generator or furnace, ready for soot removal, at a pressure of at least 3 atmospheres absolute and preferably 10–30 atmospheres absolute. A very suitable gas mixture for treatment in accordance with the instant process is that produced by the combustion device described in the co-pending U.S. patent application, Serial No. 446,256, filed July 28, 1954, now Patent No. 2,806,517, Te Nuyl et al. Another suitable device and process for the production of a suitable gas is that described in U.S. patent application, Serial No. 617,132, filed October 19, 1956, now abandoned, Te Nuyl et al.

Figure 2:
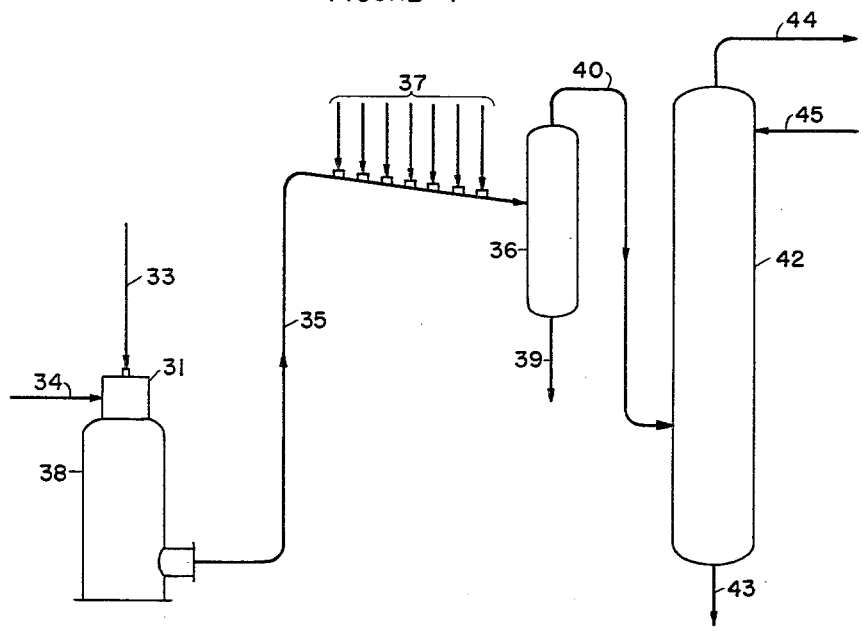

The process and the objects of the invention will be explained further with reference to the accompanying drawings, wherein:

Fig. 1 is a schematic diagram of a preferred system wherein the furnace gases are first cooled by indirect heat exchange before being water sprayed; and Fig. 2 is a schematic representation of another system which differs from that of Fig. 1 in that the hot furnace gases go directly to the spraying unit without first being cooled.

In Fig. 1 is a suitable hydrocarbon is introduced through a line 10 to the combustion chamber of a gas generator 12. The hydrocarbon is intimately mixed in the combustion chamber with a gaseous oxidant such as air or oxygen supplied through a line 14. If desired, steam may also be furnished through this latter line. The combustion gases which form have a temperature of say approximately 1300° C., flow to a space 15 where secondary reactions may occur. The hot gases leave the space 15 through a conduit 16 opening into a heat exchanger 17 which may be a steam boiler in combination with a steam superheater. Here the hot gases are cooled to a temperature of, for example, 250° C. After the gases thus cooled leave the heat exchanger they flow through a downwardly sloping conduit 18. The latter conduit at its lower end opens into a vapor-liquid separator 19 of a conventional type, say a demister provided with suitable baffles for de-entraining any liquid that may be present. The conduit 18 is supplied along its length with a series of seven spray nozzles 21 capable of providing finely dispersed water. With the line 18 inclining in the direction of flow of the gases, any moisture that may separate out of the sprayed furnace gases will flow with entrained soot to the water vapor separator. The gases are preferably sprayed to a temperature somewhat below their dew point, for example, 145° C. (the exact temperature will depend on the prevailing conditions including pressure). The soot and water will readily separate from the gaseous stream as an aqueous soot suspension which suspension is removed from the separator through a line 20.

The furnace gases leave the head space of the separator by a line 22 which enters the base of a washing tower 23 where the gases are passed in countercurrent flow to a water stream supplied through a line 25 which may be at the temperature of approximately 15° C. in order to lower the temperature of the furnace gases to the desired low temperature of say 20° C. Any traces of soot will leave the gases with the water. The cooled furnace gases are removed from the tower through a line 27 at its top. The water is drawn off from the base of the tower via line 29.

The system of Fig. 2 operates in a fashion similar to that described above for Fig. 1 differing only in that no heat exchanger or steam boiler 17 is utilized. Again, the hydrocarbon enters the gas generator 31 through a line 33 where it is mixed with air or oxygen and perhaps steam introduced through a line 34. The introduced materials combust and the resulting gases pass from the generator to a space 33. From the latter space they are moved through a line 35 to a water and vapor separator 36. The latter portion of the line 35 slants downwardly into the separator. There is arranged a series of spray nozzles 37 opening into the conduit 35 along its inclining segment. The saturated gases enter the water vapor separator and here a soot in water suspension is formed and removed from the base of the separator through a line 39. The substantially soot free furnace gases leave the separator via a conduit 40 which opens into the base of a washing tower 42. The carbon free gases rise through the washing tower 42 in countercurrent to a spray of water supplied by a line 45 which further cools the gases to about room temperature. The water leaves the tower at its bottom through a line 43 and the cooled gases exit from the top of the tower through a line 44.

We claim as our invention:

1. In the process for the removal of soot from gases, whereby an aqueous fluid is contacted with the gases without mechanical agitation, soot is incorporated in the aqueous fluid and the substantially soot-free gases are separated from the aqueous fluid-soot mixture, the improvement which comprises adjusting the temperature of the gases to between about 150–500° C., compressing the gases to at least 3 atmospheres absolute pressure, and injecting liquid water spray as the sole added fluid in an amount only sufficient to saturate the gas at its temperature and pressure and to cool it to a temperture between its dew point and 40° C. therebelow, whereby the water separated from the soot-free gas contains 2–5% by weight of soot.

2. A process in accordance with claim 1 wherein the cooling accomplished during the spraying is to a temperature within the range of about 75 to 250° C.

3. A process in accordance with claim 1 wherein the gases from the furnace are at a pressure in the range of about 10 to 30 atmospheres absolute and wherein the gases are cooled during spraying to a temperature in the range of 120–200° C.

References Cited in the file of this patent

UNITED STATES PATENTS

| | | |
|---|---|---|
| 970,654 | Sepulchre | Sept. 20, 1910 |
| 991,157 | Kestner | May 2, 1911 |